United States Patent

[11] 3,582,192

| [72] | Inventors | Manuel M. Gitlin<br>68 Oakdale Drive, Rochester, N.Y. 14618;<br>Chauncey F. Levy, Jr., 39 Wisner Road,<br>Rochester, N.Y. 14622 |
|---|---|---|
| [21] | Appl. No. | 861,631 |
| [22] | Filed | Sept. 29, 1969<br>Division of Ser. No. 475,288, July 27, 1965,<br>Pat. No. 3,475,083. |
| [45] | Patented | June 1, 1971 |

[54] DETACHABLE DECORATIVE SLEEVES FOR SPECTACLES
1 Claim, 3 Drawing Figs.

[52] U.S. Cl. .................................................. 351/52, 351/111
[51] Int. Cl. .................................................. G02c 11/02
[50] Field of Search .................................... 351/52, 51, 41, 111

[56] References Cited
UNITED STATES PATENTS
2,868,074  1/1959  Angelis .................... 351/52

FOREIGN PATENTS
| 846,425 | 8/1960 | Great Britain | 351/52 |
| 1,106,021 | 7/1955 | France | 351/52 |
| 1,281,916 | 12/1961 | France | 351/52 |
| 1,525,270 | 4/1968 | France | 351/52 |

Primary Examiner—David Schonberg
Assistant Examiner—John W. Leonard
Attorney—Shlesinger, Fiztsimmons & Shlesinger ABSTRACT: A spectacle frame has a front, lens-supporting section, and a pair of temples pivotally connected to opposite ends of the front section to swing into and out of inoperative positions in which they are folded in overlapping relation against the front section. Decorative sleeves, which are generally C-shaped in cross section, and which are made of a magnetizable material, are slidably mounted on opposite ends of the front section, and the ends of the temples pivoted thereon. Secured to the outside faces of the front section and temples beneath the removable sleeves is a layer of compressible tape containing magnetic particles which help to secure the sleeves removably on the temples and front section.

PATENTED JUN 1 1971  3,582,192

INVENTORS
MANUEL M. GITLIN
CHAUNCEY F. LEVY, JR.

BY

Shlesinger, Fitzsimmons & Shlesinger

ATTORNEYS

DETACHABLE DECORATIVE SLEEVES FOR SPECTACLES

This application is a division of our copending application Ser. No. 475,288, filed July 27, 1965, now U.S. Pat. No. 3,475,083.

The present invention relates to spectacles, and more particularly to an improved spectacle frame having decorative overlays removably secured to its temples and front, lens-supporting section.

The conventional spectacle frame usually includes a front, lens-supporting section, and a pair of temples which are pivotally connected to opposite ends of the front section, and are curved to pass over, and generally downwardly behind the ears of the wearer.

A major disadvantage of most conventional frames is that they are designed primarily as functional instruments for improving one's eyesight, or, in the case of sunglasses, for reducing sunglare. Although in some cases spectacle frames have been provided with decorative overlays for enhancing the esthetic appearance of the frames, these overlays often add objectionable weight to the frames, and usually form an integral part of a spectacle frame so that they cannot be removed; or in the cases where they are removable, it usually takes a rather skilled technician to change one overlay for another.

An object of this invention is to provide a novel spectacle frame having relatively light, decorative overlays, which are removably mounted on the frame, and which can be readily removed and replaced by differently colored or designed overlays.

A more specific object of this invention is to provide a novel spectacle frame of the type described on which generally C-shaped decorative overlays are slidably and removably mounted over opposite ends of the front, lens-supporting section of the frame, and on the adjacent ends of the temples.

Other objects of the invention will be apparent hereinafter from the specification and from the recital of the appended claims, particularly when read in conjunction with the accompanying drawing:

Figure 1:
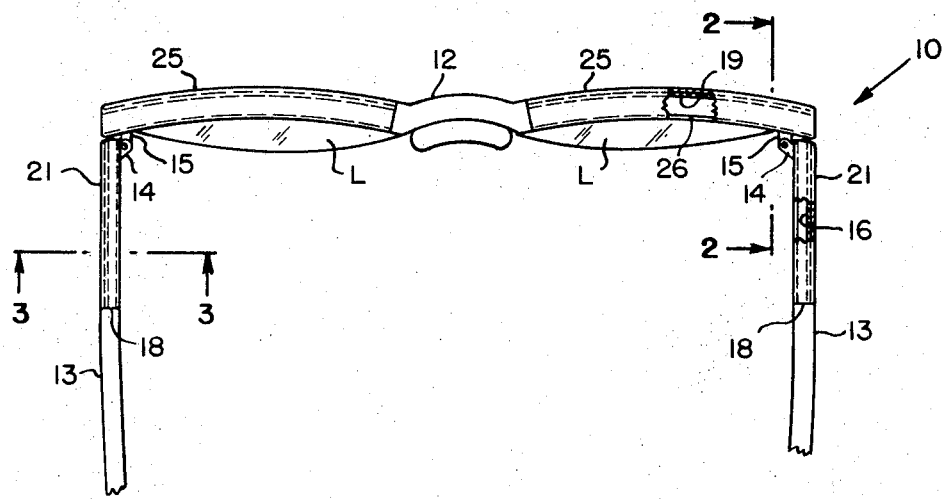
FIG. 1 is a plan of a spectacle frame made in accordance with one embodiment of this invention, with parts of the frame being cut away for purposes of illustration.
Figure 2:
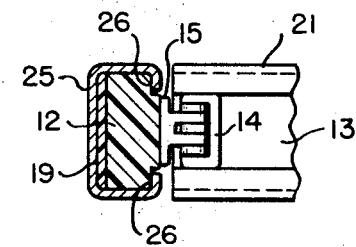
FIG. 2 is an enlarged sectional view taken along line 2–2 in FIG. 1 looking in the direction of the arrows.
Figure 3:
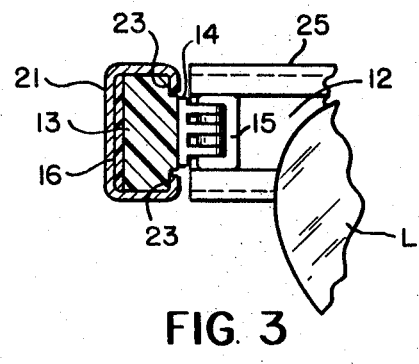
FIG. 3 is an enlarged sectional view taken along line 3–3 in FIG. 1 looking in the direction of the arrows.

Referring now to the drawing by numerals of reference, 10 denotes a spectacle frame comprising a front, lens-supporting section 12, and a pair of temples 13. A pair of lenses L may be suspended from the rear face of frame 10 in a manner disclosed, for example, in the above-noted U.S. application Ser. No. 475,288.

Each temple 13 is pivotally connected at its forward end to a temporal end of the section 12 by conventional hinge members 14 and 15. An elongate strip of compressible, magnetic tape 16 is secured to the outside face of each temple 13 between the forward end thereof and a shoulder 18 formed on the temple rearwardly of its forward end. A like strip 19 is secured to the outer face of the frame section 12 adjacent each temporal end thereof.

Removably positioned over the forward end of each temple 13 is a decorative, metal or plastic sleeve or overlay 21, which is generally C-shaped in cross section. The inner face of each overlay 21 confronts the associated tape strip 16; and its longitudinal side edges engage in parallel grooves 23 formed in the inside face of each temple. A like overlay 25 is removably positioned over each end of the front section 12 with its inner face confronting the associated strip of tape 19, and with its longitudinal side edges engaging in grooves 26 formed along the inside or rear face of section 12.

When a temple 13 is folded into its inoperative position parallel to the frame front 12, its overlay 21 may be removed by sliding it off the forward end of the temple, after which a similarly shaped, but differently designed (different color, etc.) overlay may be slid over the forward end of the temple. The overlays 25 may, of course, be changed in a similar manner, and may or may not be similar in color, etc., to those overlays 21 mounted on the temples.

Preferably overlays 21 and 25, and the associated ends of the temples 13 and section 12, respectively, upon which they are mounted, are dimensioned so that there will be a slight wedging action between the overlays and the last-named ends, as the former are slipped onto the latter. The tape 16 and 19, which may be a compressible, magnetic, foamed liner made of a standard foamed plastic containing magnetic particles, frictionally engages or grips the inside faces of the overlays, and the magnetizable filler therein further secures the overlays against movement, when the overlays comprise a magnetizable material. Also, when the hinged temples 13 are in their operative positions, as illustrated in FIG. 1, the temporal ends of front section 12 will prevent the overlays from sliding off the temples 13.

While the decorative overlays disclosed herein have been described in conjunction with lens frames of the type disclosed in said U.S. application Ser. No. 475,288, it will be understood that they could be applied to any conventional frame, if desired. The spectacle frame and/or the overlays may be made of cast acrylics, cast epoxies, cast phenolics, cast polyesters, and the like; or all or parts thereof may be made by machining metal plate or cast plastic sheet.

Having thus described our invention, what we claim is:

1. A spectacle frame comprising
   a front, lens-supporting section,
   a pair of temples,
   a pair of hinge plates secured to the insides of said temples adjacent one end thereof, and hingedly connecting said temples to opposite ends, respectively, of said front section,
   each of said temples having at the hinged end thereof a first, longitudinally extending portion which is of reduced cross-sectional area relative to the remaining portion of the temple,
   a pair of decorative sleeves, said sleeves being generally C-shaped in cross section, and being removably and slidably mounted over said first portions of said temples to cover portions of the outside faces thereof adjacent the hinged ends of the temples,
   a strip of compressible tape interposed between each of said temples and the sleeve mounted thereon frictionally to hold said sleeves on said temples,
   each of said strips of tape being secured to one of said temples and containing magnetic particles, and
   each of said sleeves comprising a magnetizable material.